Sept. 23, 1924.
J. H. JOHNSON
SOIL PULVERIZER
Filed July 27, 1923
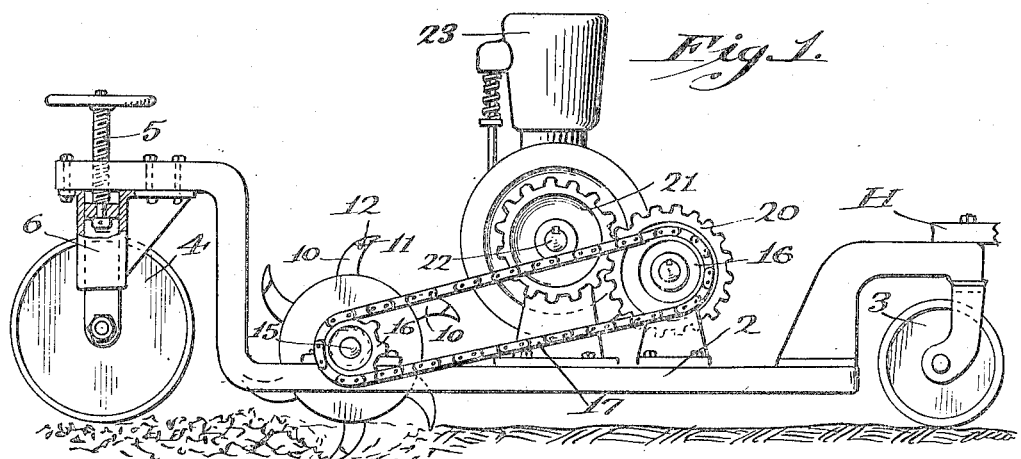
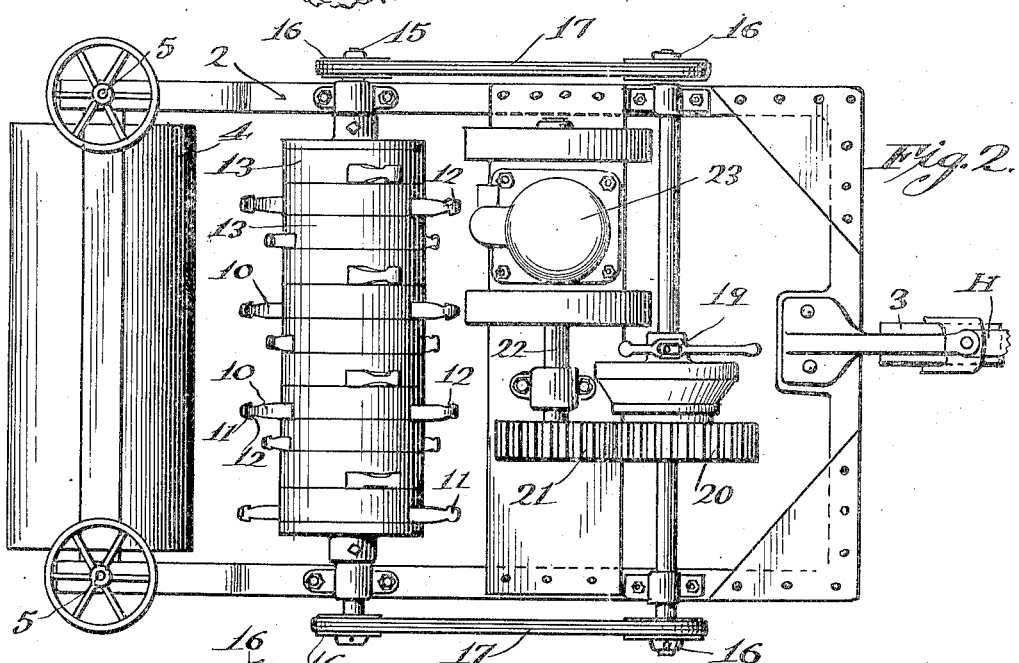
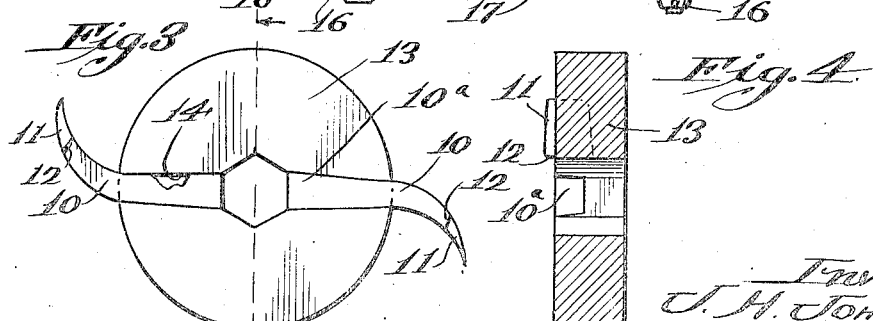

Patented Sept. 23, 1924.

1,509,652

UNITED STATES PATENT OFFICE.

JOHN HAMPTON JOHNSON, OF IMPERIAL, CALIFORNIA.

SOIL PULVERIZER.

Application filed July 27, 1923. Serial No. 654,161.

*To all whom it may concern:*

Be it known that I, JOHN HAMPTON JOHNSON, a citizen of the United States, residing at Imperial, in the county of Imperial and State of California, have invented new and useful Improvements in Soil Pulverizers, of which the following is a specification.

This invention relates to agricultural implements.

An object of the invention is to provide a machine for effectively and at low cost of operation thoroughly pulverizing soil. Another object is to provide a soil pulverizing machine that will effectually pulverize the soil by a single traversing movement over the area to be treated and thereby to economize in time, labor and equipment.

An object is to provide an agricultural implement including a gang of soil penetrating and pulverizing saw-like teeth which are adapted to be driven rotatively at a sufficiently high rate of speed to pulverize the soil as it is penetrated while the implement is being slowly advanced over the area to be treated.

Another object is to provide in soil pulverizing machines a pulverizing instrument including a gang of renewable pulverizing teeth.

Other objects and advantages will be set forth in the following specification of an embodiment of the invention illustrated in the accompanying drawings, wherein:

Fig. 1 is a side elevation of the implement, a part of which is broken away.

Fig. 2 is a plan of the implement.

Fig. 3 is an elevation of one of the detached tooth carriers and its teeth.

Fig. 4 is a section on line 4—4 of Fig. 3.

The implement includes any suitable frame 2 at the front end of which is arranged a supporting steering means as a pivot wheel 3. The rear end of the frame is preferably supported on an elongated roller or drum 4 of as light construction as is consistent with the desired strength. The frame is adapted to be raised and lowered by suitable means as, for instance, screws 5 mounted in the rear end of the frame and connected to adjustable bearings 6 of the roller 4.

The implement is adapted to be drawn at any desired speed over an area of soil to be treated or otherwise propelled; in the present case a hitch H being shown attached to the front end of the frame 2.

An important feature of the invention consists of a rotary instrument having teeth to cut with a saw-like pulverizing action into the soil over which the implement is run.

A pulverizing means includes a set of substantially radial teeth 10 preferably having hook-shaped ends 11, the sides of which are recessed or notched as at 12. The teeth 10 are preferably arranged in diametrically opposite relation in suitable drivers or carriers shown as consisting of discs 13 having each a recessed side to receive the shanks $10^a$ of the teeth 10. Preferably the shanks $10^a$ taper outwardly and are thus held in their complementary recesses 14 in the carriers 13 which are shown as discs, though they may be of any other form.

The discs are adapted to be detachably secured upon a driving axle 15 and are mounted on the axle to be rotated thereby. In the present case the axle is shown as of non-circular cross section.

The discs or carriers 13 are adjusted side by side on the axle 15 in such relation that the teeth 10 are progressively offset around the axle, as is clearly shown in Fig. 2.

The axle is driven at a desired rate of speed by any suitable means. Such means may include sprocket gears and chains 16 and 17, one set of the gears being secured on a countershaft 18 on which may be provided any suitable clutch 19 to engage a driven gear 20 on shaft 18. This gear engages a gear 21 mounted on a shaft 22 of any suitable motor 23. The gears 20, 21 form means readily removed to permit change of speed as between the engine 23 and the pulverizer.

It is desirable to drive the rotary pulverizer at such a high rate of speed as compared to the rate of travel of the implement that the teeth of the pulverizer will act like a buzz saw upon the soil to finely comminute the same. In other words, in operation the implement is advanced rather slowly over the soil while the teeth 10 are rotated at high speed.

Change of speed may be obtained as between the engine and the pulverizer in any suitable manner, as for instance the sprocket wheels 16 which are secured to the countershaft 18 can be changed and larger or smaller gears used.

Further embodiments, modifications and variations may be resorted to within the spirit of the invention.

What is claimed is:

1. In a pulverizer, a rotary instrument comprising radial teeth, discs having recessed sides to receive the teeth, a driving axle extending through the discs, and means for holding the discs upon the axle to hold the teeth.

2. In a pulverizer, a driving axle, discs mounted side by side upon the axle and having recesses in their sides, teeth mounted in the recesses, said teeth and recesses being tapered from their inner ends, and means for holding the discs upon the axle.

In testimony whereof I have signed my name to this specification.

JOHN HAMPTON JOHNSON.